United States Patent [19]
Tsunoda et al.

[11] 4,346,304
[45] Aug. 24, 1982

[54] METHOD OF CONTROLLING OPERATION OF FRANCIS TYPE PUMP TURBINES

[75] Inventors: Sachio Tsunoda; Kaneo Sugishita, both of Yokohama, Japan

[73] Assignee: Tokyo Shibaura Denki Kabushiki Kaisha, Kanagawa, Japan

[21] Appl. No.: 210,238

[22] Filed: Nov. 25, 1980

[51] Int. Cl.³ .............................................. F01D 15/10
[52] U.S. Cl. ........................................ 290/52; 415/1; 415/500
[58] Field of Search ...................... 290/52; 415/1, 500

[56] References Cited

U.S. PATENT DOCUMENTS 3,236,498  2/1966  Kerensky ........................... 415/500
3,658,436  4/1972  Oishi et al. ............................ 415/1
3,682,563  8/1972  Takashima ............................ 415/1

FOREIGN PATENT DOCUMENTS 47-38341  9/1972  Japan .

Primary Examiner—J. V. Truhe
Assistant Examiner—Shelley Wade

Attorney, Agent, or Firm—Stevens, Davis, Miller & Mosher

[57] ABSTRACT

In a Francis type pump turbine, for the purpose of switching the operation of a synchronous dynamoelectric machine from synchronous condenser operation wherein compressed air is admitted into a runner chamber to force down water level therein so as to cause a runner to rotate in air, to a synchronous generator operation, the air is released from the runner chamber and an inlet valve and guide vanes are completely or nearly completely closed. Then the inlet valve and guide vanes are gradually opened until a predetermined degree of opening is reached while maintaining the degree of opening of the guide vanes to be larger than that of the inlet valve. After the predetermined degree of opening, both the inlet valve and the guide vanes are gradually opened. But at this time the degree of opening of the inlet valve is maintained to be larger than that of the guide vanes. To switch from the generator operation to the condenser operation the same characteristic curves are traced in the opposite direction.

5 Claims, 10 Drawing Figures

METHOD OF CONTROLLING OPERATION OF FRANCIS TYPE PUMP TURBINES

BACKGROUND OF THE INVENTION

This invention relates to a method of controlling the operation of a Francis type pump turbine, more particularly a method of controlling the operation of the pump turbine when the operation of a dynamoelectric machine, acting as a synchronous generator or a motor, and directly coupled with the runner of the pump turbine is switched between a generator operation in which the dynamoelectric machine is connected to an electric power system to operate synchronously therewith and a synchronous condenser operation.

In a Francis type pump turbine, it is often operated as a water turbine under no load condition so as to operate the dynamoelectric machine as a synchronous condenser for controlling the power factor or stability of the power system. To operate the dynamoelectric machine as a synchronous condenser, it is connected to the power system, and the guide vanes and an inlet valve are fully closed while at the same time compressed air is admitted into the runner chamber to force down the water level therein to a predetermined level in a draft tube so as to rotate the runner in air thus decreasing a reaction torque acting upon the runner.

To switch the operation of the dynamoelectric machine from the condenser operation to the generator operation while the generator is being connected to the power system, the inlet valve is closed and the compressed air in the runner chamber is released to cause the runner to rotate as a water turbine in a shut off state. Thereafter, the guide vanes are opened to pass water through the runner to initiate power generation, the quantity of water being controlled by the degree of opening of the guide vanes.

Figure 1:
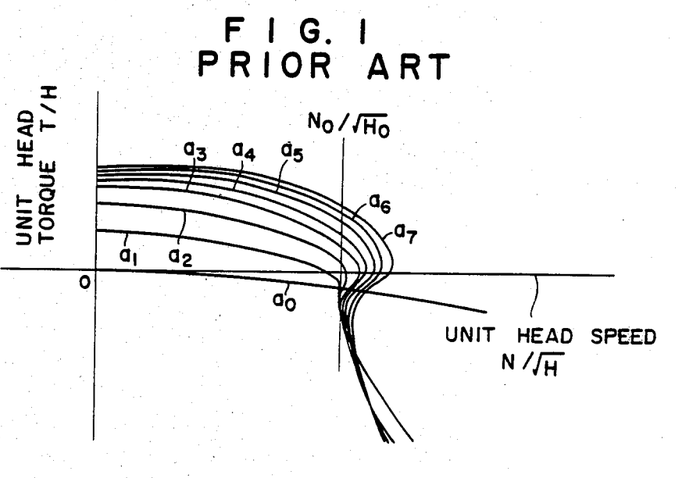
FIG. 1 is a graph showing the relationship between the speed and torque characteristics per unit head difference of a Francis type pump turbine.

Among hydraulic machines, the runner blades of the Francis type pump turbine are designed such that the centrifugal force effect of the runner against the water flow would be large for pumping up water when it is operated as a pump. For this reason, even in a turbine operation, the pressure in a runner chamber would be increased due to a large centrifugal force of the rotating runner under a shut off state or small water flow quantity state near no load condition so that water will be forced into a spiral chamber from the runner. When the inlet valve is fully opened, water can be pumped up. Where the characteristic of torque T acting upon the runner for respective degrees of opening of the guide vanes is expressed in terms of the relative relationship between a unit torque per one meter head T/H and a speed per one meter head $N/\sqrt{H}$ (where N represents the speed of the water wheel, H the operating head), the characteristic curve of the unit torque per one meter head T/H of a Francis type pump water tends to bend in a direction in which the unit speed per one meter head $N/\sqrt{H}$ decreases near no load (zero torque condition) and then rapidly drops into a negative torque region as shown in FIG. 1. In FIG. 1, a curve $a_0$ represents the fully opened state of the guide vanes and has the following relation with respective degrees of opening $$a_0 < a_1 < a_2 \ldots a_7.$$

Figure 2:
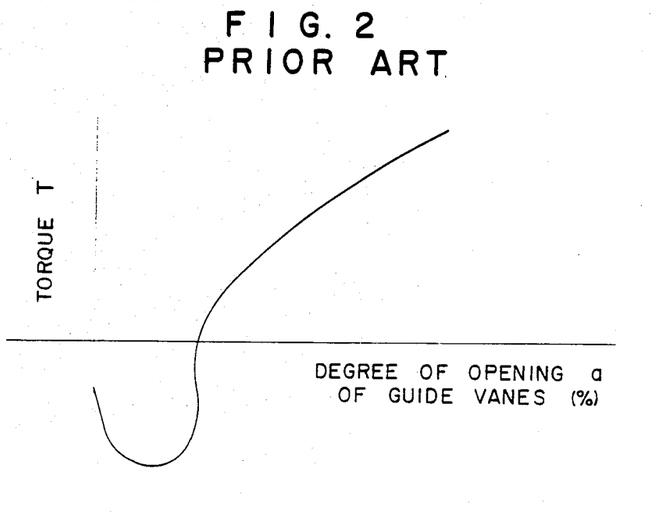
FIG. 2 is a graph showing the relationship between the degree of opening of the guide vanes and the torque during a constant head difference operaton of the Francis type pump turbine.
Figure 3:
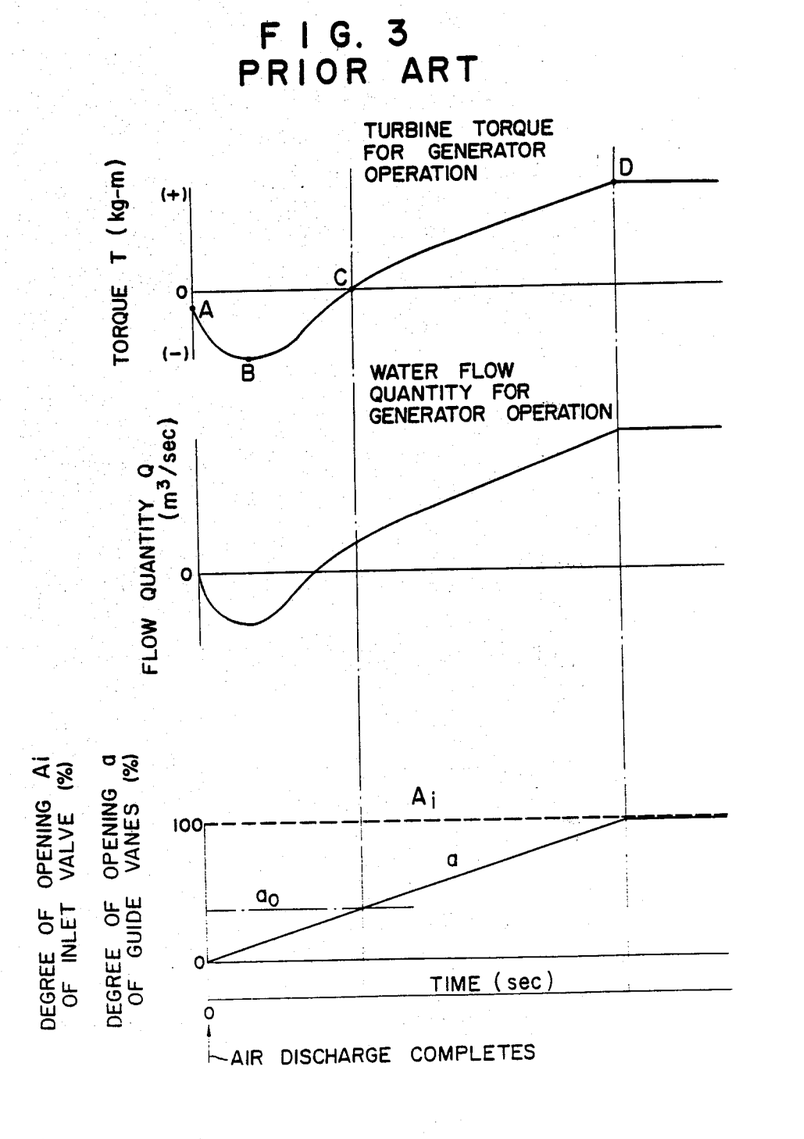
FIG. 3 are graphs showing the relationship between time and torque; flow quantity; and degrees of opening of the inlet valve and guide vanes respectively at the time of switching the operation of a prior art pump turbine between condenser operation and generator operation.

In FIG. 1 when the hydraulic machine is operated as a turbine after determining the operating head $H_0$ on the low head difference side where the torque characteristics bend greatly under a rated rotating speed $N_0$ the relationship between the degree of opening a of the guide vanes and the torque T is shown by a graph shown in FIG. 2. With a hydraulic machine having such characteristic when the operation of the turbine is switched to a generator operation from the shut off operation, when the guide vanes are opened after fully opening or sufficiently opening the inlet valve according to the prior art method, characteristics as shown in FIG. 3 are obtained. In this case, as shown by the uppermost graph shown in FIG. 3, with increase in the degree of opening of the guide vanes the running state changes such that, after falling into a large negative torque region to reach a lowest state B, then to a desired generator running state (positive torque) after passing through a no load (torque) running state C. Thus, although the running state should be rapidly switched to the generator operation when the power demand increases, according to the prior art method by which the water flow is adjusted only with the guide vanes, as the hydraulic machine must pass through an extremely large negative torque region, not only a large electric power is consumed but also the load of the generator rapidly varies, thus causing a surge or power fluctuation in the electric power system.

For this reason in a hydraulic machine having a bent torque characteristic as above described, while the generator is being connected to the power system when the operation is switched from the synchronous condenser operation to the generator operation it is necessary to provide control apparatus capable of smoothly switching the operating state of the generator without passing through a negative torque region.

The problem of the negative torque caused by the opening of the guide vanes also occurs when the generator is switched to the synchronous condenser operation from the generator operation.

SUMMARY OF THE INVENTION

It is therefore an object of this invention to provide a novel method of controlling the operation of a Francis type pump turbine capable of stably controlling the running state of a dynamoelectric machine without producing an excessively large negative torque when the dynamoelectric machine is switched from a synchronous condenser operation to a generator operation and vice versa.

According to this invention, in a Francis type pump turbine comprising a runner chamber, a runner disposed in the runner chamber and directly coupled to a synchronous dynamoelectric machine for operating the same as a synchronous condenser or a synchronous generator, a spiral casing disposed to surround the runner chamber, guide vanes disposed between the runner and the spiral casing, an inlet valve positioned at an inlet of the spiral casing, and a draft tube connected to the runner chamber, there is provided a method of controlling an operation of the Francis type pump turbine comprising the steps of completely or substantially completely closing the inlet valve and the guide vanes, admitting compressed gas into the runner chamber to press down water level therein to a predetermined level in the draft tube so as to cause the runner to rotate in the gas thereby operating the synchronous dynamoelectric machine as a synchronous condenser, releasing the gas from the runner chamber, and then initiating opening of the inlet valve and the guide vanes so as to switch the operation of the dynamoelectric machine from synchronous condenser operation to synchronous generator operation.

According to a modified embodiment the guide vanes and the inlet valve are controlled such that a degree of opening of the guide vanes is larger than the degree of opening of the inlet valve between a completely closed position of the guide vanes and a region of a predetermined degree of opening under no load, and thereafter the degree of opening of the inlet valve is made to be larger than that of the guide vanes.

When the generator operation is switched to the condenser operation similar characteristic curve is traced in the opposite direction.

DESCRIPTION OF THE PREFERRED EMBODIMENTS

Figure 4:
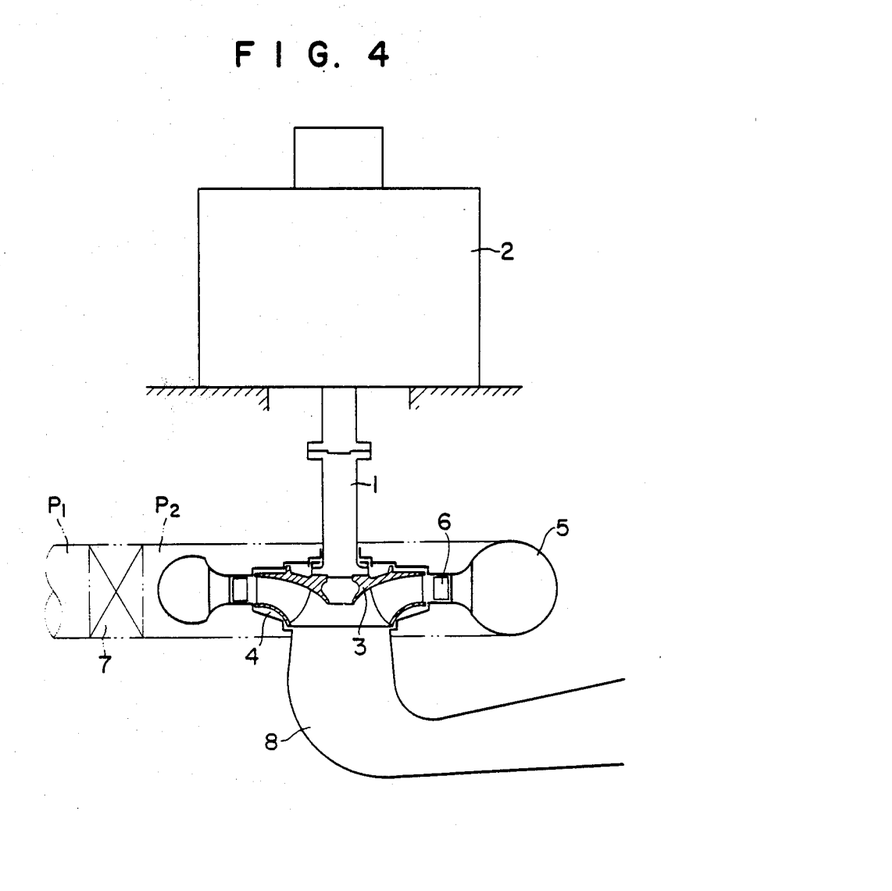
FIG. 4 is a side view, partly in section, showing a typical Francis type pump turbine to which the invention is applicable.

Before describing the method of controlling the operation of a Francis type pump turbine according to this invention, the construction of a typical pump turbine to which the instant invention is applicable will firstly be outlined with reference to FIG. 4.

The pump turbine shown in FIG. 4 comprises a main shaft 1, a synchronous dynamoelectric machine 2 operating as a synchronous generator or a synchronous condenser directly coupled to the upper end of the shaft 1 and a runner 3 secured to the lower end thereof to rotate in a runner chamber 4. A spiral casing 5 is disposed to surround the runner chamber 4, and guide vanes 6 are disposed between them. An inlet valve 7 is disposed at the inlet side of the spiral casing 5 and an elbow shaped draft tube 8 is connected to the central portion of the runner chamber 4.

To operate the dynamoelectric machine 2 as a synchronous condenser, the inlet valve and the guide vanes 7 are fully closed and the runner 3 is rotated in the same direction as a turbine while at the same time compressed air is admitted into the runner chamber 4 to force down the water level in the runner chamber 4 to a predetermined level in the draft tube 4 thereby causing the runner to rotate in air.

Figure 5:
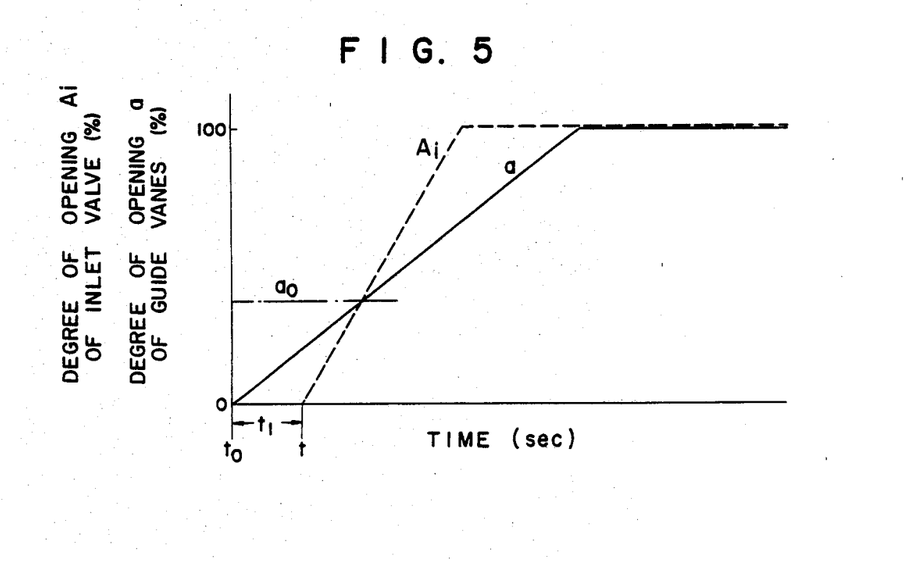
FIGS. 5 and 6 are graphs showing preferred embodiments of the method of control embodying the invention.
Figure 6:
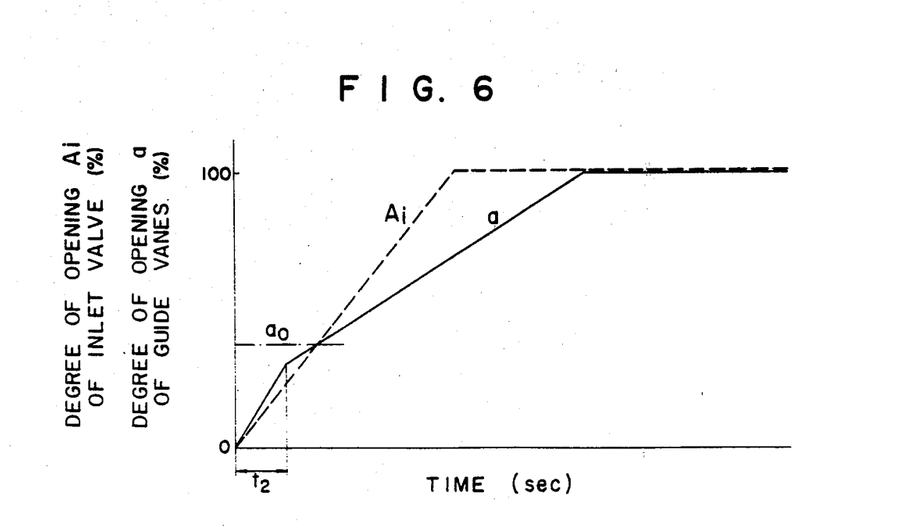

To switch the operation of the dynamoelectric machine to the generator operation from the condenser operation, an air relief valve, not shown, is opened to release the compressed air in the runner chamber 4 and then the guide vanes 6 and the inlet valve 7 are opened according to the characteristic curves a and Ai shown in FIG. 6. In the embodiment shown in FIG. 5 these valves are operated such that the opening speed of the guide vanes 6 would be lower than that of the inlet valve 7 so that the time t at which the inlet valve 7 begins to open would be later by a time $t_1$ than the time $t_0$ at which the gude vanes 6 begin to open. However, it should be noted that it is essential for the instant invention to control the valve opening such that up to a predetermined degree of opening $a_0$ near the no load degree of opening the degree of opening a of the guide vanes 6 should be larger than that Ai of the inlet valve 7 and beyond the predetermined degree of opening $a_0$, the degree of opening Ai of the inlet opening should be larger than that a of the guide vanes 6.

In the embodiment shown in FIG. 6, the vanes 6 and valve 7 are controlled such that the guide vanes 6 and the inlet valve 7 are opened simultaneously, but up to the no load degree of opening $a_0$ of the guide vanes 6, the degree of opening a of the guide vanes would be larger than that Ai of the inlet valve 7, and that beyond the predetermined degree of opening $a_0$ near the no load opening, the degree of opening Ai of the inlet valve 7 should be larger than that a of the guide vanes 6. For this reason, the opening characteristic of the degree of opening a of the guide vanes 6 changes from higher speed to lower speed after an interval $t_2$.

Figure 7:
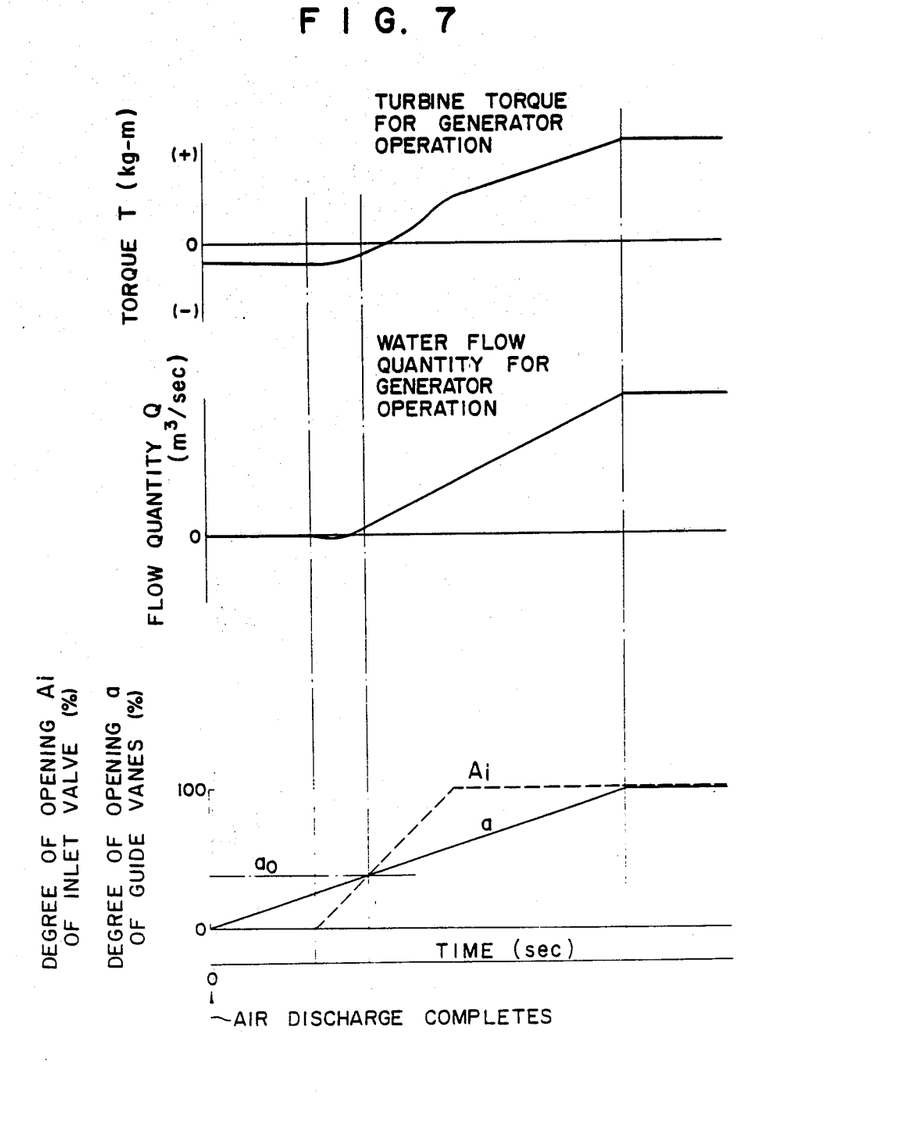
FIGS. 7 and 8 ae graphs similar to that shown in FIG. 3 and useful to explain the method of control of this invention.

FIG. 7 shows the relationship among time in seconds, and torque T, the water flow quantity Q, degree of openings of the inlet valve and the guide vanes when the operation of the dynamoelectric machine is switched from the condenser operation to the generator operation by opening the guide vanes 6 and the inlet valve 7 along the valve opening characteristics shown in FIG. 7.

Figure 8:
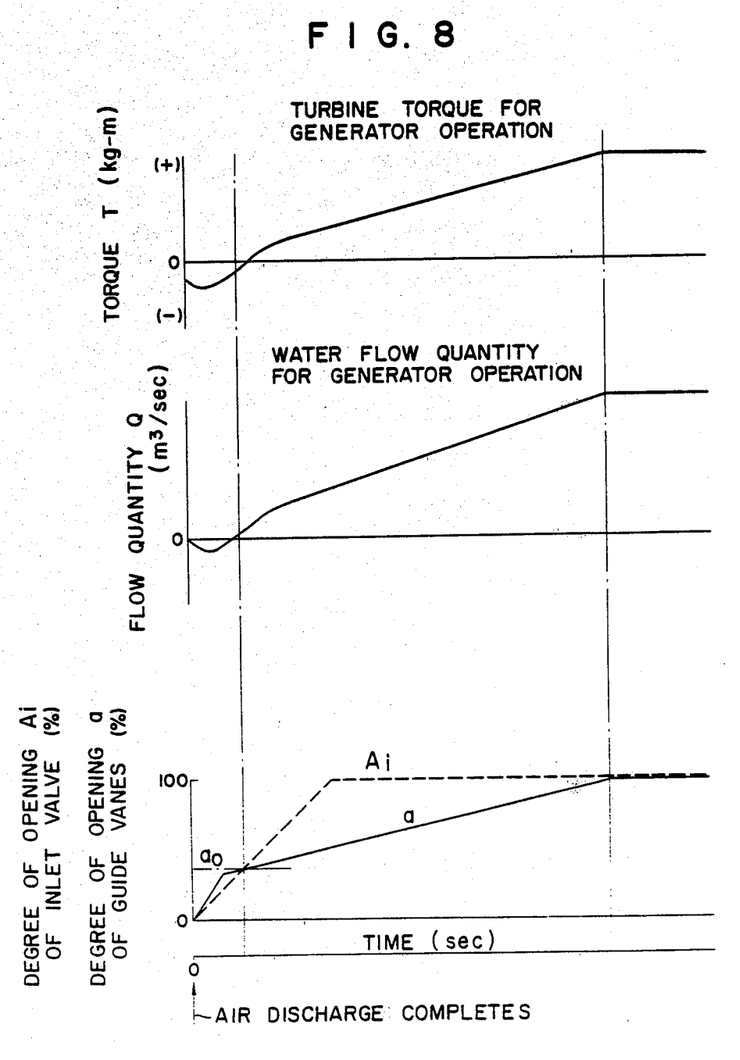

FIG. 8 shows graphs similar to FIG. 7 obtainable when the operation of the dynamoelectric machine is switched from the condenser operation to the generator operation by opening the guide vanes 6 and the inlet valves 7 along the valve opening characteristics shown in FIG. 6.

As can be noted from these figures, a negative torque or a runner reaction torque which is the same or slightly larger than that created under the sealed off state of the turbine acts upon the dynamoelectric machine.

As above described, according to the method of this invention, since the inlet valve and the guide vanes are controlled such that at the time of switching the operation of the dynamoelectric machine from the condenser operation to the generator operation the degree of opening of the inlet valve 7 is made to be smaller than that of the guide vanes up to a predetermined degree of opening of the guide vanes near the predetermined degree of opening thereof under no load, at a flow path portion inside of the inlet valve, it is possible to increase the water pressure therein by the centrifugal force action of the runner 3 while the machine is operating as a synchronous condenser so as to make the water pressure $P_2$ to be substantially equal to or balance with the penstock water pressure $P_1$ outside of the inlet valve.

Accordingly, it becomes possible to stably pass through the region of small degree of opening while the quantity of water acting upon the runner 3 is being limited to substantially zero. For this reason, the runner is subjected to a negative torque or the runner reaction torque equal to or a slightly larger than the torque created under the shut off state of the runner, thus obviating the problem of excessively large torque which has been inevitable in the prior art method of control.

Moreover, since the control is effected such that the degree of opening of the inlet valve 7 is made to be larger than that of the guide vanes at the time of passing through a region of the degree of opening which is larger than that of the guide vanes under no load so that it is possible to gradually lower the water pressure inside of the inlet valve 7, thus smoothly controlling the water flow from the penstock into the runner by the guide vanes with the result that the operation of the dynamoelectric machine can be smoothly changed to a stable generator operation.

Although in the foregoing description the operation of the dynamoelectric machine connected to an electric power line was switched from the synchronous condenser operation to the generator operation, the same advantageous effect can also be obtained when the operation of the dynamoelectric machine is switched from the generator operation to the synchronous condenser operation provided that the characteristics described above are traced in the opposite direction.

Figure 9:
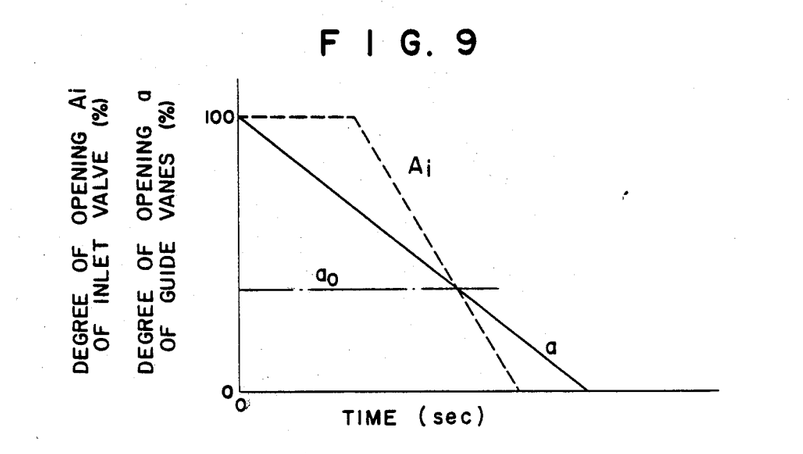
FIGS. 9 and 10 are graphs showing the relationship between the time and the degree of opening of the inlet valve and the guide vanes respectively of the other embodiments of this invention.
Figure 10:
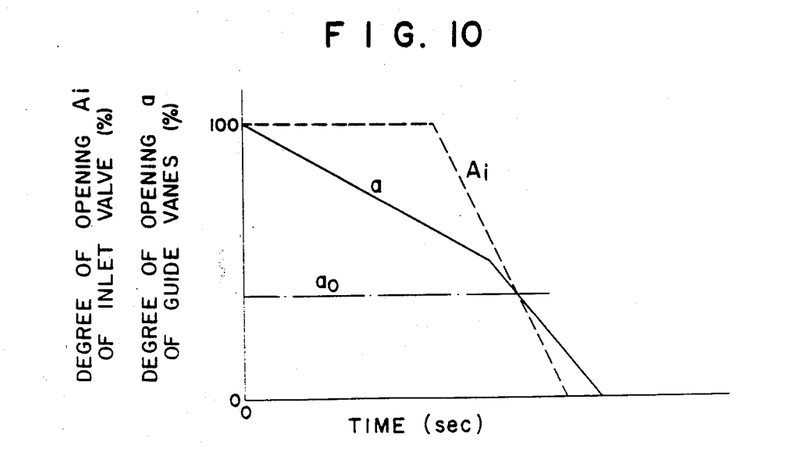

FIGS. 9 and 10 show the characteristic curves utilized in this case, in which in a generator operation range wherein the degree of opening $A_i$ of the inlet valve is larger than a predetermined degree of opening $a_0$ of the guide vanes the guide vanes and the inlet valve are gradually closed while maintaining the degree of opening $A_i$ of the inlet valve to be larger than that $a$ of the guide vanes, whereas in a region wherein the degree of opening is smaller than the predetermined degree of opening $a_0$ the inlet valve and the guide vanes are gradually closed while maintaining the degree of opening $A_i$ to be smaller than that $a$ of the guide vanes.

Although in the embodiments shown in FIGS. 5 and 6 the inlet valve and the guide vanes were controlled such that the relative degree of opening of the guide vanes and the inlet valve reverses, it should be understood that the invention is not limited to these specific embodiments. For example, the guide vanes may begin to open while the inlet valve 7 is in a fully closed state or in a partially opened state of less than 70%.

We claim:

1. In a Francis type pump turbine comprising a runner chamber, a runner disposed in said runner chamber and directly coupled to a synchronous dynamoelectric machine for operating the same as a synchronous condenser or a synchronous generator, a spiral casing disposed to surround said runner chamber, guide vanes disposed between said runner chamber and said spiral casing, an inlet valve positioned at an inlet of said spiral casing, and a draft tube connected to said runner chamber, a method of controlling an operation of said Francis type pump turbine comprising the steps of
    completely or substantially completely closing said inlet valve and said guide vanes;
    admitting compressed gas into said runner chamber to press down water level therein to a predetermined level in said draft tube so as to cause said runner to rotate in said gas thereby operating said synchronous machine as a synchronous condenser;
    releasing said gas from said runner chamber; and
    then initiating opening of said inlet valve and said guide vanes so as to switch the operation of said dynamoelectric machine from synchronous condenser operation to synchronous generator operation.

2. The method according to claim 1 wherein said guide vanes and said inlet valve are controlled such that a degree of opening of said guide vanes is larger than a degree of opening of said inlet valve between a completely closed position of said guide vanes and a region of predetermined degree of opening thereof which is set near a degree of opening under no load, and thereafter the degree of opening of said inlet valve becomes larger than the degree of opening of said guide vanes.

3. In a Francis type pump turbine comprising a runner chamber, a runner disposed in said runner chamber and directly connected to a synchronous dynamoelectric machine for operating the same as a synchronous condenser or a synchronous generator, a spiral casing disposed to surround said runner chamber, guide vanes disposed between said runner and said spiral casing, an inlet valve positioned at an inlet of said spiral casing, and a draft tube connected to said runner chamber, a method of controlling an operation of said Francis type pump turbine comprising the steps of
    initiating closing of said inlet valve preceding to closing operation of said guide vanes or before completion of said closing operation;
    completely closing said inlet valve;
    fully closing said guide vanes; and
    thereafter admitting compressed gas into said runner chamber so as to force down water level in said runner chamber to a predetermined level in said draft tube so as to rotate said runner in said compressed gas thereby switching operation of said synchronous dynamoelectric machine from a generator operation to a synchronous condenser operation.

4. The method according to claim 3 wherein said inlet valve and said guide vanes are controlled such that a degree of opening of said inlet valve would be larger than that of said guide vanes when degree of opening characteristic passes through a region of the degree of opening larger than a predetermined degree of opening set near a no load degree of opening of said guide vanes, and that the degree of opening of said inlet valve would be smaller than that of the guide vanes when the degree of opening characteristic of said guide vanes passes through a region of the degree of opening which is smaller than said predetermined degree of opening of said guide vanes, thus
    gradually bringing said inlet valve and said guide vanes to fully closed state; and
    admitting compressed gas into said runner chamber to force down water level in said runner chamber to the predetermined level in said draft tube so as to cause said runner to rotate in said gas.

5. In a Francis type pump turbine comprising a runner chamber, a runner disposed in said runner chamber and directly coupled to a synchronous dynamoelectric machine for operating the same as a synchronous condenser or a synchronous generator, a spiral casing disposed to surround said runner chamber, guide vanes disposed between said runner and said spiral casing, an inlet valve positioned at an inlet of said spiral casing, and a draft tube connected to said runner chamber, a method of controlling an operation of said Francis type pump turbine comprising the steps of maintaining both of said inlet valve and said guide vanes at a normal opened state while said dynamoelectric machine is being operated as a synchronous generator;

gradually decreasing degrees of opening of said inlet valve and said guide vanes while maintaining the degree of opening of said inlet valve to be larger than that of said guide vanes until a predetermined degree of opening is reached; and thereafter gradually decreasing the degrees of opening of said inlet valve and said guide vanes while maintaining the degree of opening of said guide vanes to be larger than that of said inlet valve, thus switching the operation of said dynamoelectric machine from synchronous generator operation to synchronous condenser operation.

* * * * *